(12) United States Patent
Hsu et al.

(10) Patent No.: US 9,265,102 B2
(45) Date of Patent: Feb. 16, 2016

(54) LIGHT-EMITTING DIODE LIGHTING DEVICE WITH ADJUSTABLE COLOR RENDERING INDEXES

(71) Applicant: IML International, Grand Cayman (KY)

(72) Inventors: Horng-Bin Hsu, Taipei (TW); Yi-Mei Li, New Taipei (TW); Yung-Hsin Chiang, New Taipei (TW)

(73) Assignee: IML International, Ugland House, Grand Cayman (KY)

( * ) Notice: Subject to any disclaimer, the term of this patent is extended or adjusted under 35 U.S.C. 154(b) by 0 days.

(21) Appl. No.: 14/639,129

(22) Filed: Mar. 5, 2015

(65) Prior Publication Data

US 2015/0257214 A1    Sep. 10, 2015

Related U.S. Application Data

(60) Provisional application No. 61/949,264, filed on Mar. 7, 2014.

(51) Int. Cl.
  *H05B 33/08*    (2006.01)

(52) U.S. Cl.
  CPC .......... *H05B 33/0812* (2013.01); *H05B 33/083* (2013.01); *H05B 33/0857* (2013.01)

(58) Field of Classification Search
  CPC .......... H05B 33/0812; H05B 33/0857; H05B 33/089
  USPC ............. 315/201, 186, 185 R, 307, 193, 161; 363/126
  See application file for complete search history.

(56) References Cited

U.S. PATENT DOCUMENTS

2014/0217908 A1* 8/2014 Chiang ................ H05B 33/083
                                                              315/186

* cited by examiner

*Primary Examiner* — Daniel D Chang
(74) *Attorney, Agent, or Firm* — Winston Hsu; Scott Margo

(57) ABSTRACT

An LED lighting device includes first through third luminescent devices and first through third current controllers. The first and second luminescent devices are driven by a rectified AC voltage for providing light of a first color. The third luminescent device is driven by the rectified AC voltage for providing light of a second color different from the first color. The first through third current controllers are configured to regulate the current flowing through the first through third current controllers according to a first current setting, a second current setting and a third current setting, respectively. The color rendering index of the LED lighting device can thus be adjusted flexibly.

11 Claims, 10 Drawing Sheets

US 9,265,102 B2

LIGHT-EMITTING DIODE LIGHTING DEVICE WITH ADJUSTABLE COLOR RENDERING INDEXES

CROSS REFERENCE TO RELATED APPLICATIONS

This application claims the benefit of U.S. provisional application No. 61/949,264 filed on Mar. 7, 2014.

BACKGROUND OF THE INVENTION

1. Field of the Invention

The present invention is related to an LED lighting device, and more particularly, to an LED lighting device with high power factor and adjustable color rendering index.

2. Description of the Prior Art

An LED lighting device directly driven by a rectified alternative-current (AC) voltage usually adopts a plurality of LEDs coupled in series in order to provide required luminance. As the number of the LEDs increases, a higher forward-bias voltage is required for turning on the LED lighting device, thereby reducing the effective operational voltage range of the LED lighting device. As the number of the LEDs decreases, the large driving current when the rectified voltage is at its maximum level may impact the reliability of the LEDs. Therefore, there is a need for an LED lighting device capable of improving the effective operational voltage range and the reliability.

Additionally, color rendering refers to the effect of an illuminant on the color appearance of objects by conscious or subconscious comparison with their color appearance under a reference illuminant, as defined by the International Commission on Illumination (CIE). the color rendering index (CRI) is a quantitative measure of the ability of a light source to reveal the colors of various objects faithfully in comparison with an ideal or natural light source. Generally speaking, light sources with a high CRI are desirable in color-critical applications such as photography and cinematography. However, the CRI of a conventional LED lighting device, generally 60-70, is very poor. Therefore, there is a need for an LED lighting device capable of improving the effective operational voltage range, the reliability and the color rendering index.

SUMMARY OF THE INVENTION

The present invention provides an LED lighting device having a first luminescent device driven by a rectified AC voltage for providing light of a first color according to first current, a second luminescent device coupled in series to the first luminescent device and driven by the rectified AC voltage for providing light of the first color according to second current, a third luminescent device driven by the rectified AC voltage for providing light of a second color according to third current, a first current controller configured to regulate the first current according to a first current setting, a second current controller configured to regulate the second current according to a second current setting, and a third current controller configured to regulate the third current according to a third current setting. The second color is different from the first color. The first current controller includes a first pin coupled to the first end of the first luminescent device, a second pin, and a third pin coupled to the second end of the first luminescent device. The second current controller includes a first pin coupled to the second luminescent device and a second pin coupled to the rectified AC voltage. The third current controller includes a first pin coupled to the third luminescent device and a second pin.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
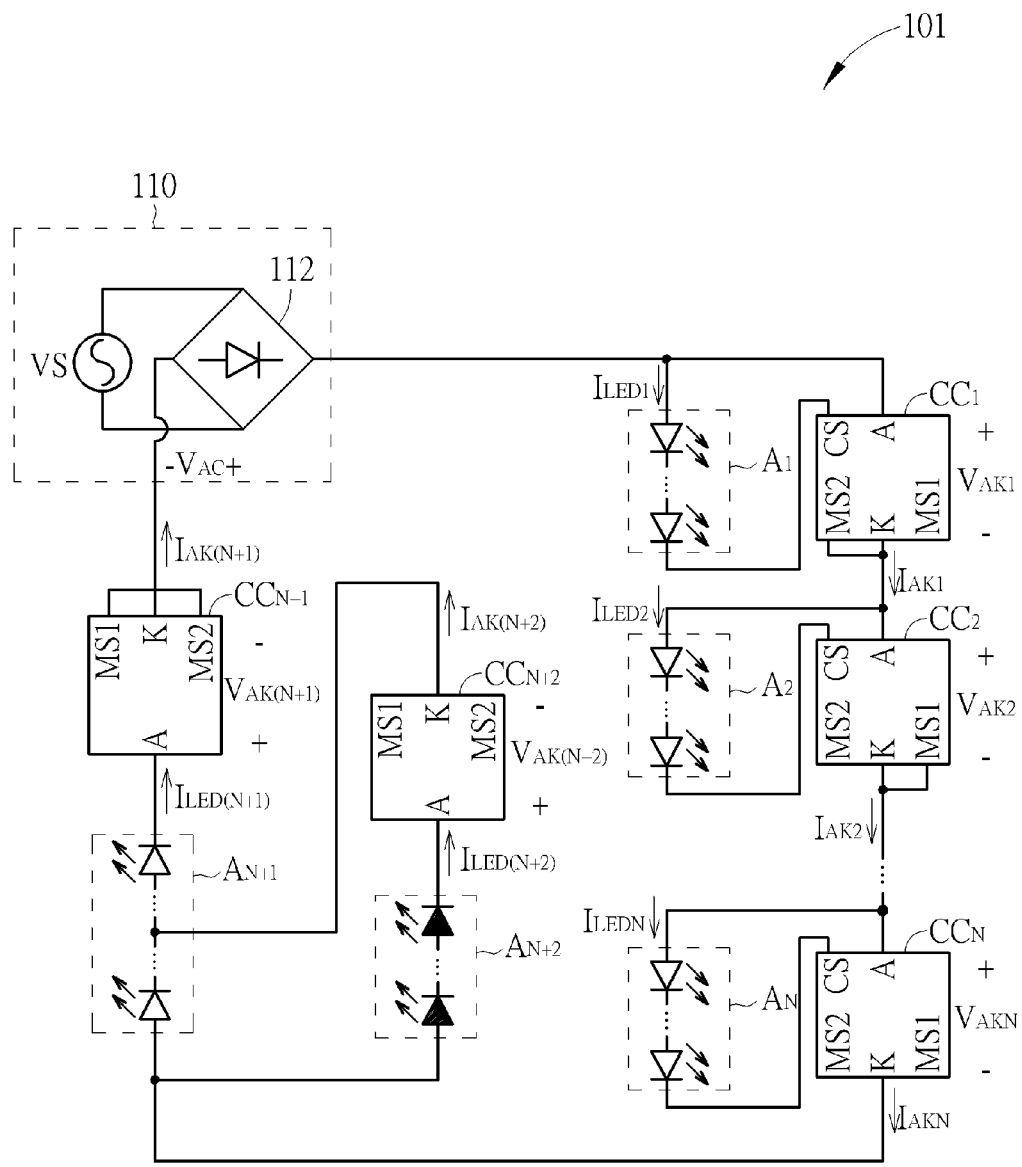
FIGS. 1~3 are diagrams illustrating LED lighting devices according to embodiments of the present invention.
Figure 2:
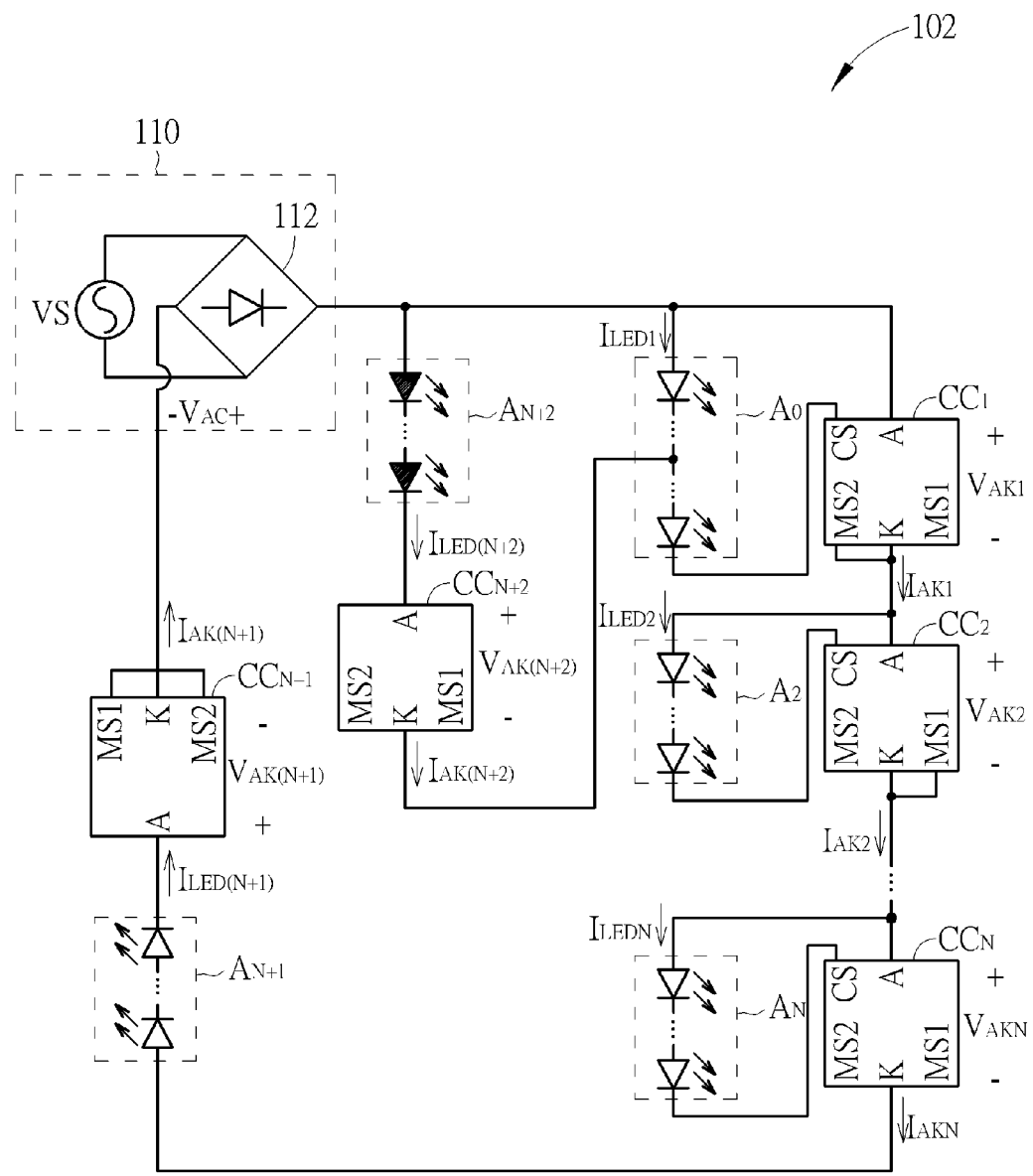
Figure 3:
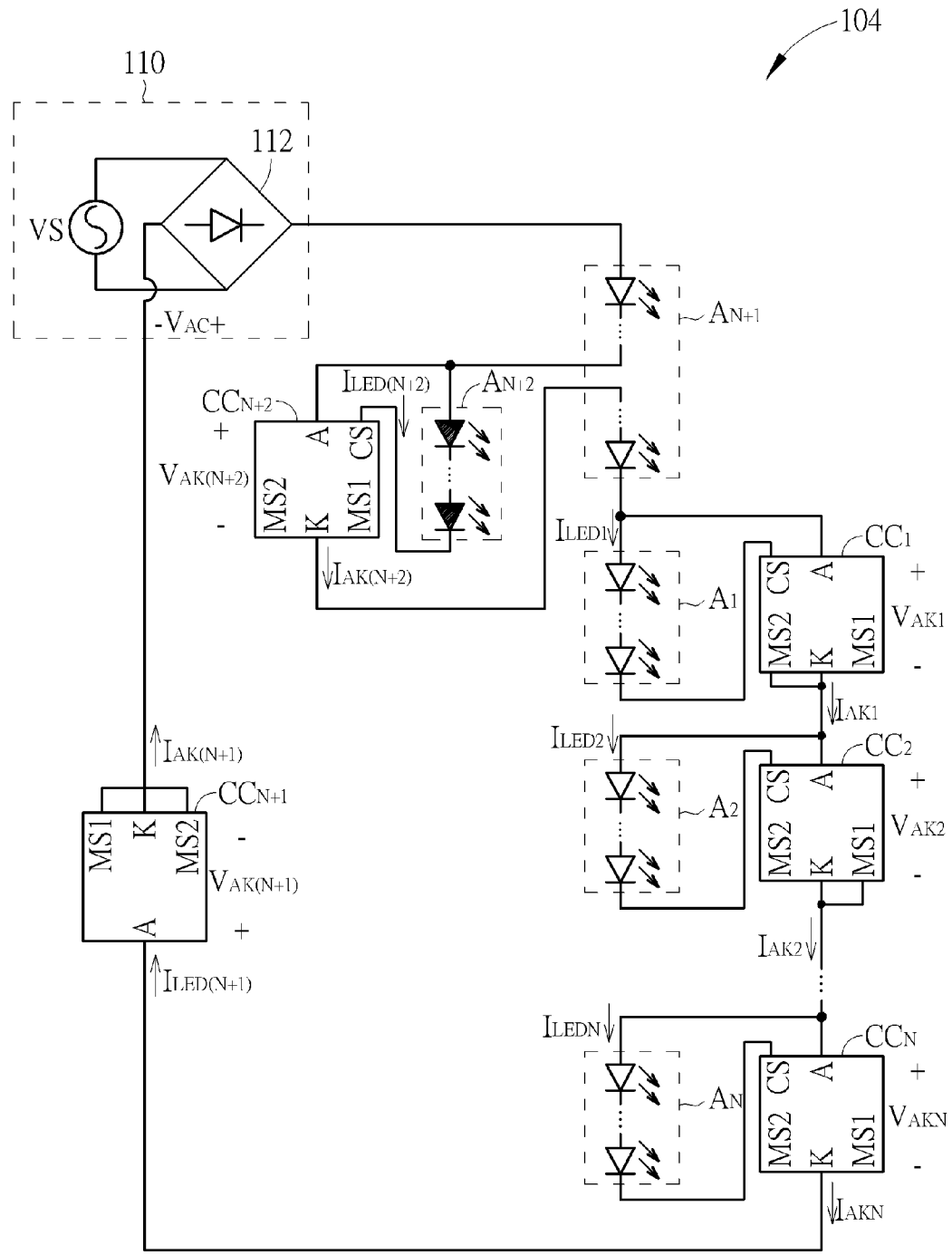
Figure 4:
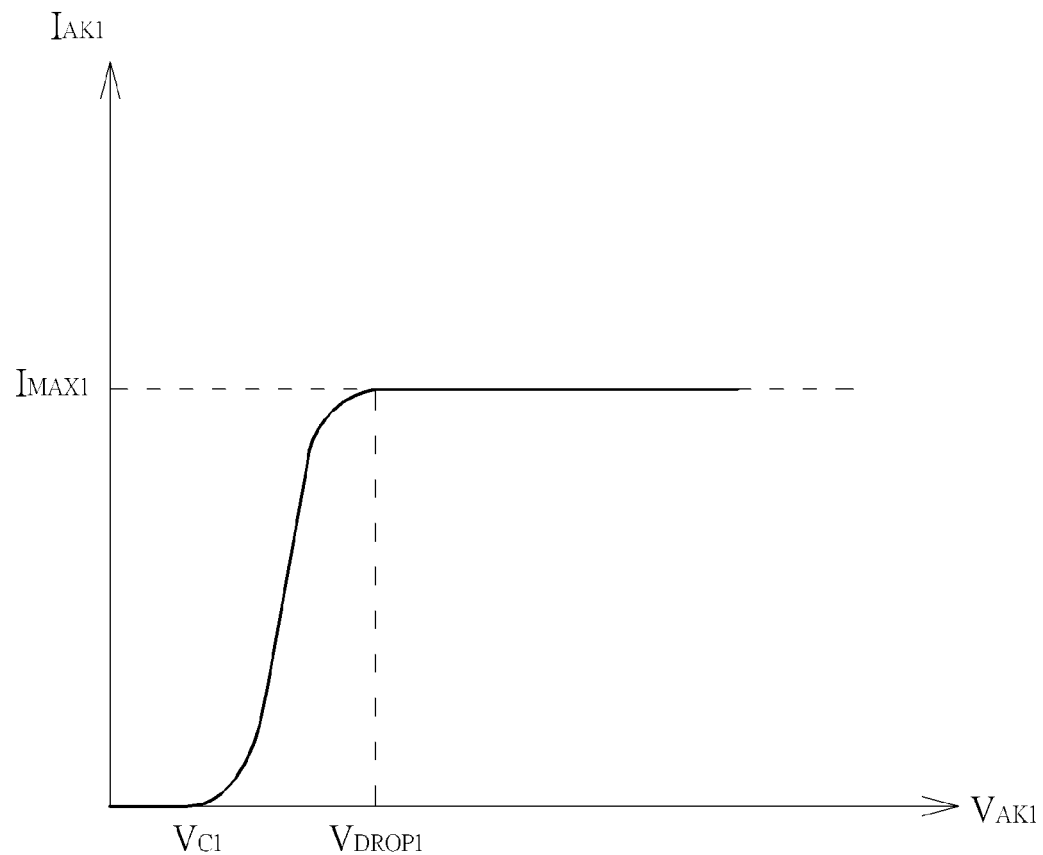
FIGS. 4~8 illustrate the operation of the LED lighting device according to embodiments of the present invention.
Figure 5:
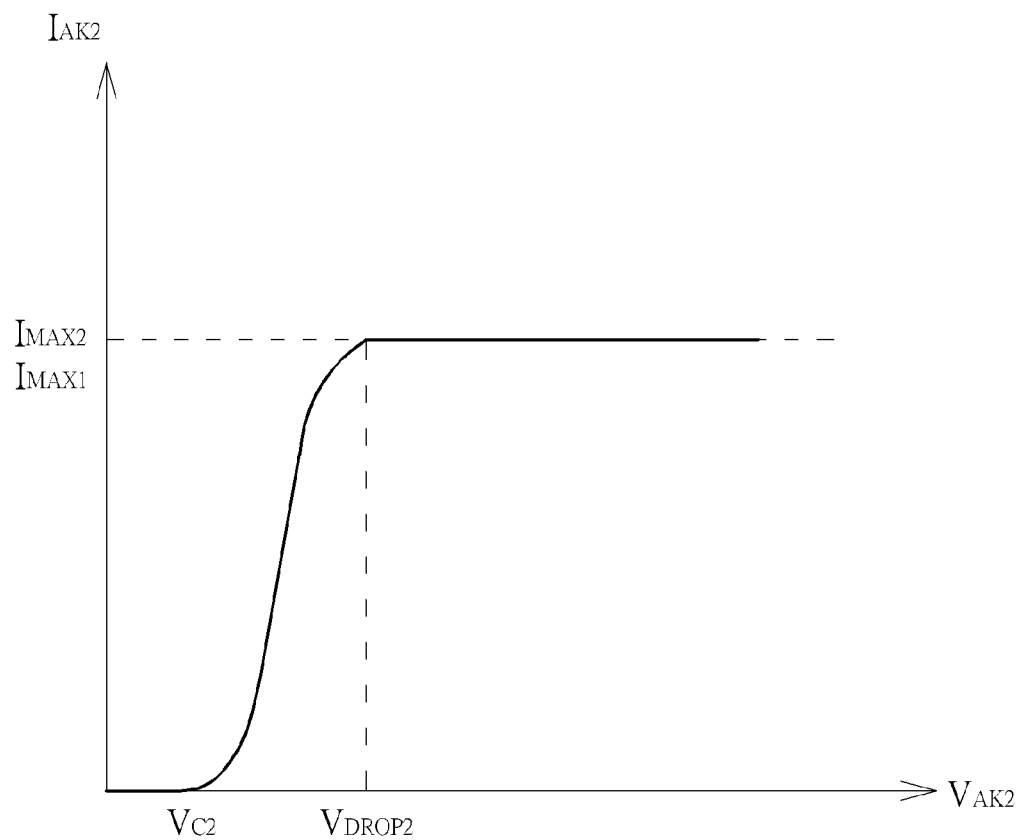
Figure 6:
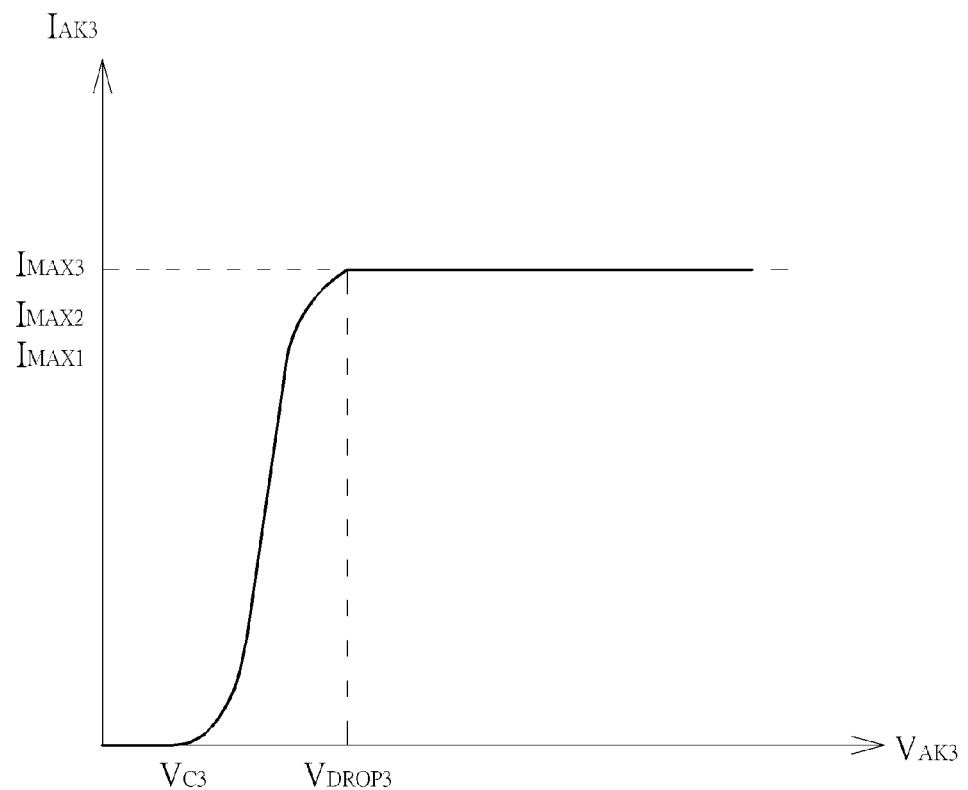
Figure 7:
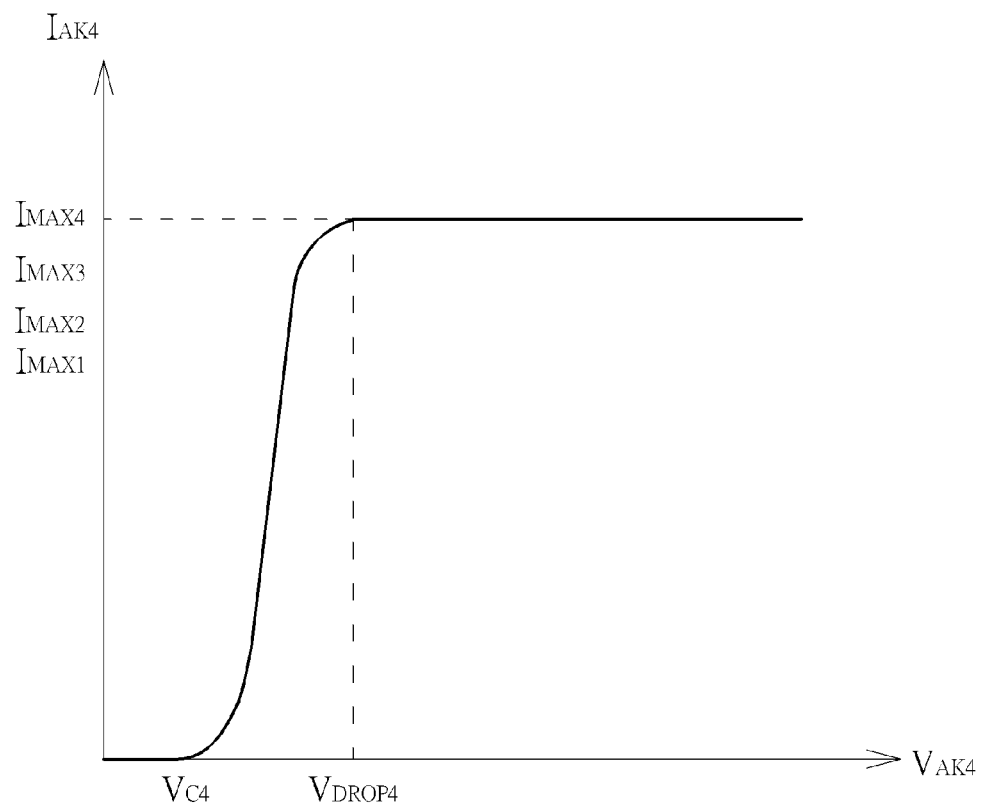
Figure 8:
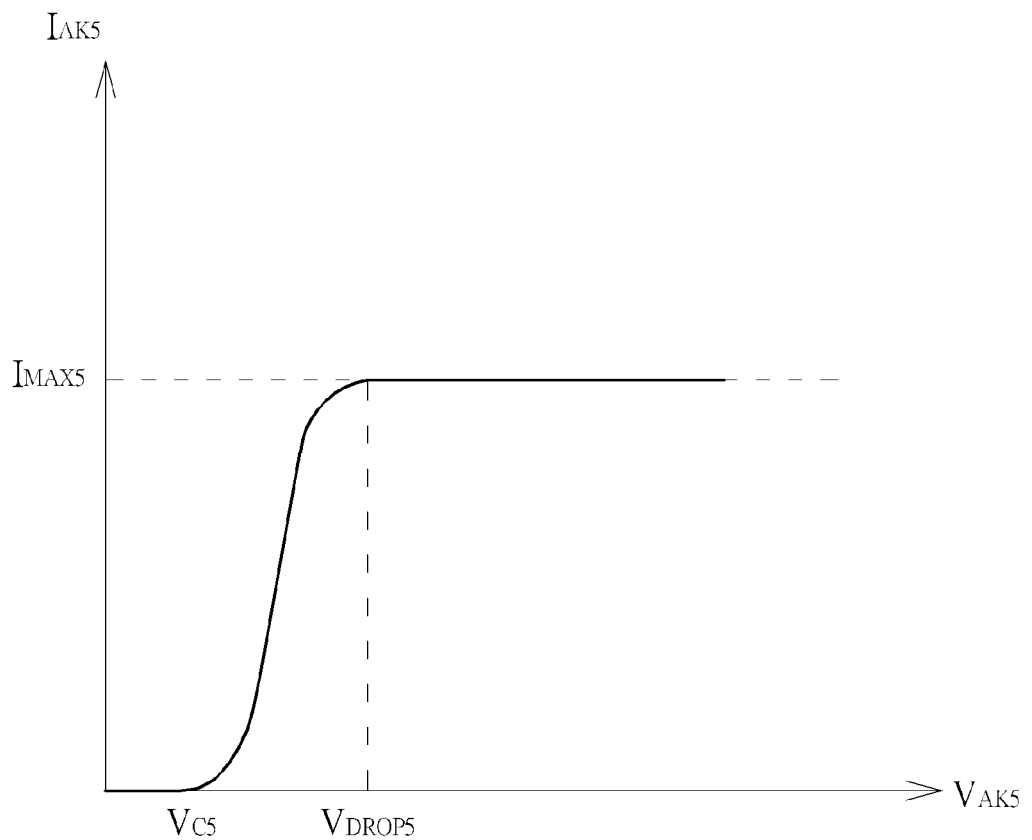

FIGS. 1~3 are diagrams illustrating LED lighting devices 101~103 according to embodiments of the present invention. Each of the LED lighting devices 101~103 includes a power supply circuit 110, a plurality of luminescent devices, and a plurality of current controllers. The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the plurality of luminescent devices. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. The configuration of the power supply circuit 110 does not limit the scope of the present invention.

In the present invention, each luminescent device may adopt a single LED or multiple LEDs coupled in series. FIGS. 1~3 depict the embodiment using multiple LEDs which may consist of single-junction LEDs, multi-junction high-voltage (HV) LEDs, or any combination of various types of LEDs. However, the types and configurations of the luminescent devices $A_1$~$A_{N+2}$ do not limit the scope of the present invention.

In the embodiment depicted in FIG. 1, the LED lighting device 101 includes (N+2) luminescent devices $A_1$~$A_{N+2}$ and (N+2) current controllers $CC_1$~$CC_{N+2}$, wherein N is a positive integer. The luminescent devices $A_1$~$A_{N+1}$ are coupled in series. The current controllers $CC_1$~$CC_N$ are coupled in parallel to the luminescent devices $A_1$~$A_N$, respectively. The current controllers $CC_{N+1}$~$CC_{N+2}$ are coupled in series to the luminescent devices $A_{N+1}$~$A_{N+2}$, respectively. The luminescent device $A_{N+2}$ and the current controller $CC_{N+2}$ are coupled in parallel to one, multiple or all LEDs in the luminescent device $A_{N+1}$. The luminescent devices $A_1$~$A_{N+1}$ are arranged so as to provide a first color, while the luminescent device $A_{N+2}$ is arranged so as to provide a second color different from the first color. For example, the first color and the second color may have different color temperatures.

In the embodiment depicted in FIG. 2, the LED lighting device 102 includes (N+2) luminescent devices $A_1$~$A_{N+2}$ and (N+2) current controllers $CC_1$~$CC_{N+2}$, wherein N is a positive integer. The luminescent devices $A_1$~$A_{N+1}$ are coupled in series. The current controllers $CC_1$~$CC_N$ are coupled in parallel to the luminescent devices $A_1$~$A_N$, respectively. The current controllers $CC_{N+1}$~$CC_{N+2}$ are coupled in series to the luminescent devices $A_{N+1}$~$A_{N+2}$, respectively. The luminescent device $A_{N+2}$ and the current controller $CC_{N+2}$ are coupled in parallel to one, multiple or all LEDs in one of the luminescent devices $A_1 \sim A_N$. The luminescent devices $A_1 \sim A_{N+1}$ are arranged so as to provide a first color, while the luminescent device $A_{N+2}$ is arranged so as to provide a second color different from the first color. For example, the first color and the second color may have different color temperatures.

In the embodiment depicted in FIG. 3, the LED lighting device 103 includes (N+2) luminescent devices $A_1 \sim A_{N+2}$ and (N+2) current controllers $CC_1 \sim CC_{N+2}$, wherein N is a positive integer. The luminescent devices $A_1 \sim A_{N+1}$ are coupled in series. The current controllers $CC_1 \sim CC_N$ are coupled in parallel to the luminescent devices $A_1 \sim A_N$, respectively. The current controller $CC_{N+1}$ is coupled in series to the luminescent device $A_{N+1}$. The current controller $CC_{N+2}$ is coupled in parallel to the luminescent device $A_{N+2}$. The luminescent device $A_{N+2}$ and the current controller $CC_{N+2}$ are coupled in series to the luminescent device $A_{N+1}$ In a configuration, the luminescent device $A_{N+2}$ may be coupled between the power supply circuit 110 and the luminescent device $A_{N+1}$. In another configuration, the luminescent device $A_{N+2}$ may be coupled between the luminescent device $A_{N+1}$ and the luminescent device $A_1$. In yet another configuration as depicted in FIG. 3, the luminescent device $A_{N+2}$ may be coupled between two adjacent LEDs in the luminescent device $A_{N+1}$ The luminescent devices $A_1 \sim A_{N+1}$ are arranged in order to provide a first color, while the luminescent device $A_{N+2}$ is arranged in order to provide a second color different from the first color. For example, the first color and the second color may have different color temperatures.

Each of the current controllers $CC_1 \sim CC_{N+2}$ may be fabricated as a chip having a first pin A, a second pin K, a third pin CS, and n mode selection pins $MS1 \sim MSn$, wherein n is a positive integer satisfying $2^n \geq (N+1)$. In the current controllers $CC_1 \sim CC_{N+2}$, the mode selection pins $MS1 \sim MSn$ are either coupled to its Pin A, Pin K or floating.

In FIGS. 1~3, $V_{AK1} \sim V_{AK(N+2)}$ represent the voltages established across the corresponding current controllers $CC_1 \sim CC_{N+2}$, respectively. $I_{AK1} \sim I_{AK(N+2)}$ represent the current flowing through the corresponding current controllers $CC_1 \sim CC_{N+2}$, respectively. $I_{LED1} \sim I_{LED(N+2)}$ represent the current flowing through the corresponding luminescent devices $A_1 \sim A_{N+2}$, respectively.

FIGS. 4~8 illustrate the operation of the LED lighting devices 101~103 with the embodiment when N=3 and n=2. FIGS. 4~8 depict the current-voltage (I-V) curves of the current controllers $CC_1 \sim CC_5$, respectively. $V_{C1} \sim V_{C5}$ represent the cut-in voltages at which the current controllers $CC_1 \sim CC_5$ begin to conduct, respectively. $V_{DROP1} \sim V_{DROP5}$ represent the drop-out voltages of the current controllers $CC_1 \sim CC_5$ at which the current $I_{AK1} \sim I_{AK5}$ reach corresponding current settings $I_{MAX1} \sim I_{MAX5}$, respectively. In the embodiment of the present invention, the cut-in voltages $V_{C1} \sim V_{C5}$ for turning on the corresponding current controllers $CC_1 \sim CC_5$ are smaller than the cut-in voltages for turning on the corresponding luminescent devices $A_1 \sim A_5$, respectively. When the voltage established across a specific luminescent device exceeds its cut-in voltage, the specific luminescent device may be placed in a conducting ON state; when the voltage established across the specific luminescent device does not exceed its cut-in voltage, the specific luminescent device may be placed in a non-conducting OFF state.

In FIGS. 4~8, during the rising and falling periods of the rectified voltage $V_{AC}$ when $0 < V_{AK1} < V_{DROP1}$, $0 < V_{AK2} < V_{DROP2}$, $0 < V_{AK3} < V_{DROP3}$, $0 < V_{AK4} < V_{DROP4}$, or $0 < V_{AK5} < V_{DROP5}$, each of the current controllers $CC_1 \sim CC_5$ is not completely turned on and operates as a voltage-controlled device in a linear mode in which the current $I_{AK1} \sim I_{AK5}$ changes with the voltages $V_{AK1} \sim V_{AK5}$ in a specific manner, respectively. For example, if the current controller $CC_1$ is implemented using metal-oxide-semiconductor (MOS) transistors, the relationship between the current $I_{AK1}$ and the voltage $V_{AK1}$ may correspond to the I-V characteristic of an MOS transistor when operating in the linear region.

In FIGS. 4~8, during the rising and falling periods of the rectified voltage $V_{AC}$ when $V_{AK1} > V_{DROP1}$, $V_{AK2} > V_{DROP2}$, $V_{AK3} > V_{DROP3}$, $V_{AK4} > V_{DROP4}$ or $V_{AK5} > V_{DROP5}$, each of the current controllers $CC_1 \sim CC_5$ operates in a constant-current mode and functions as a current limiter. Therefore, the current $I_{AK1} \sim I_{AK5}$ flowing through the current controllers $CC_1 \sim CC_5$ may be clamped at the current settings $I_{MAX1} \sim I_{MAX5}$ respectively, instead of changing with the voltages $V_{AK1} \sim V_{AK5}$.

In many applications, the current controllers $CC_1 \sim CC_5$ may be required to provide different current settings. The present invention may thus provide flexible designs using the current controllers $CC_1 \sim CC_5$ with flexible current settings by setting the mode selection pins MS1 and MS2. In the embodiments depicted in FIGS. 4~8 for illustrative purpose, the current controllers $CC_1 \sim CC_4$ are configured in a way so that $I_{MAX1} < I_{MAX2} < I_{MAX3} < I_{MAX4}$ However, the values of the current settings $I_{MAX1} \sim I_{MAX4}$ do not limit the scope of the present invention.

In many applications, the LED lighting devices 101~103 may be required to provide a specific CRI. As previously stated, in the embodiment when N=3 and n=2, the luminescent devices $A_1 \sim A_4$ are arranged in order to provide the first color, while the luminescent device $A_5$ is arranged in order to provide the second color different from the first color. The present invention may thus adjust the luminance of the luminescent device $A_5$ using the current controller $CC_5$, thereby improving the CRI of the LED lighting devices 101~103. Therefore, the brightness of the second color provided by the luminescent device $A_5$ may be easily selected in order to achieve different degrees of color rendering index. In the embodiment depicted in FIG. 8 for illustrative purpose, the current controller $CC_5$ is configured in a way so that $I_{MAX5} = I_{MAX3}$. However, the value of the current setting $I_{MAX5}$ does not limit the scope of the present invention.

Figure 9:
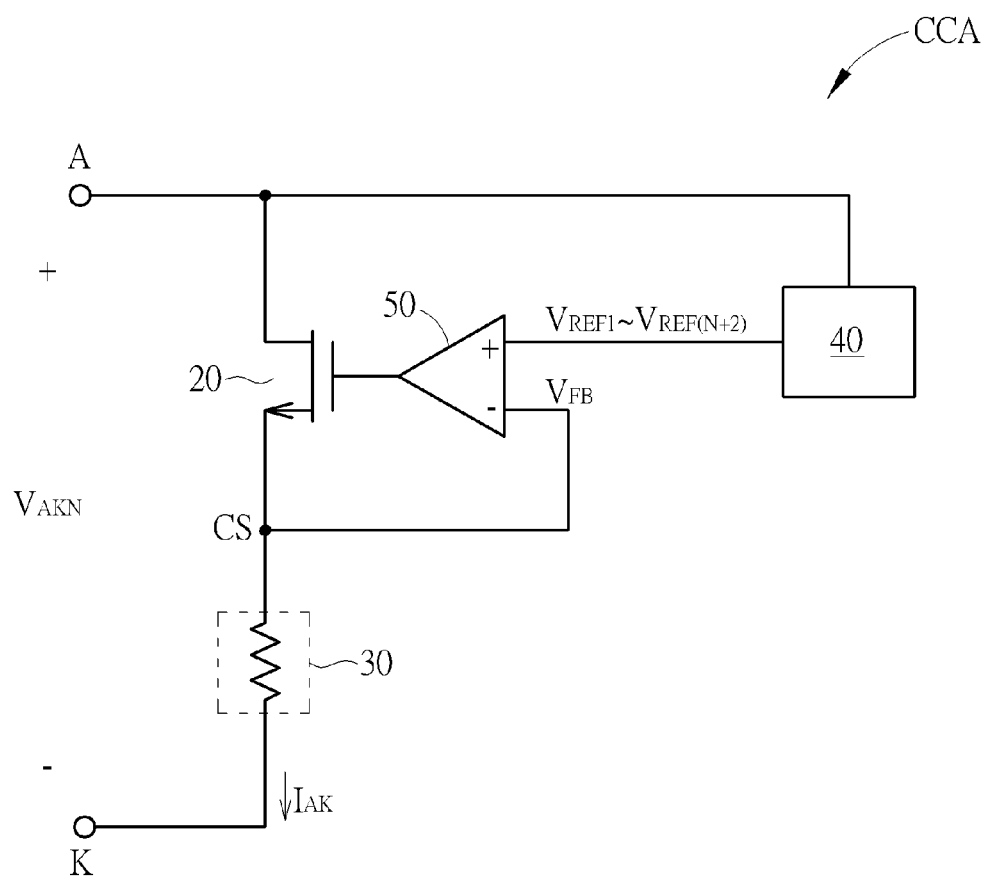
FIGS. 9 and 10 are diagrams illustrating current controllers according to embodiments of the present invention.
Figure 10:
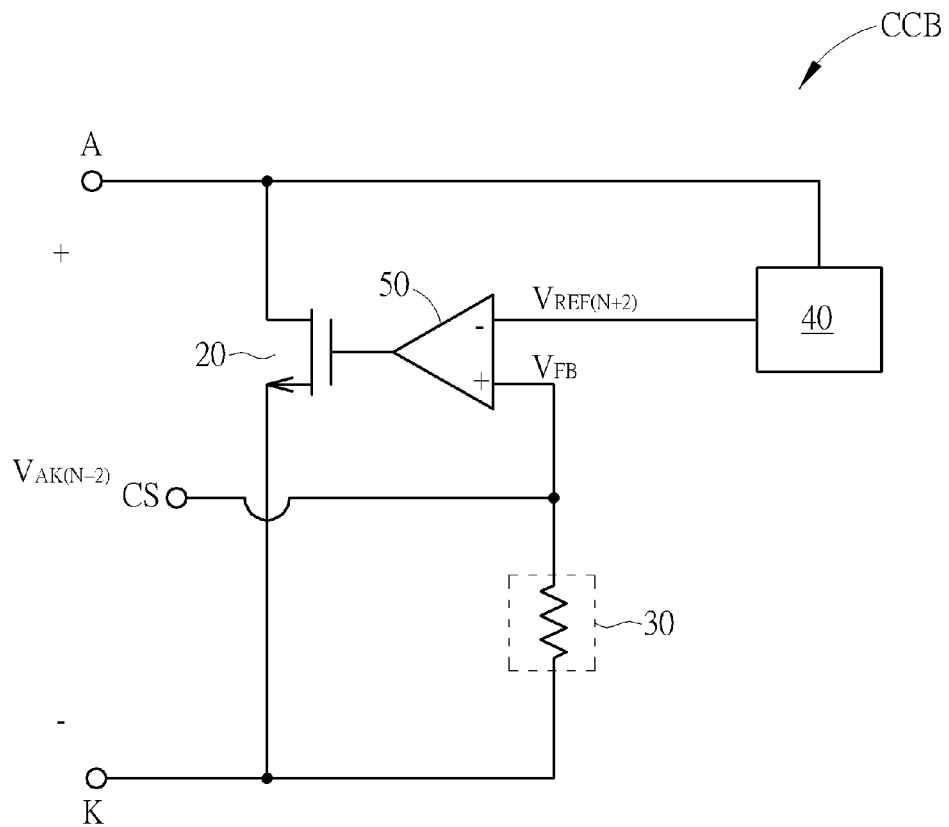

FIG. 9 is a diagram illustrating a current controller CCA according to an embodiment of the present invention. FIG. 10 is a diagram illustrating a current controller CCB according to another embodiment of the present invention. The current controller CCA may be used for implementing the current controllers $CC_1 \sim CC_{N+2}$ in the LED lighting devices 101~102 and the current controllers $CC_1 \sim CC_{N+1}$ in the LED lighting device 103. The current controller CCB may be used for implementing the current controller $CC_{N+2}$ in the LED lighting device 103.

Each of the current controllers CCA and CCB includes a switch 20, a current-detecting circuit 30, an adjustable reference voltage generator 40, and a comparator 50.

The switch 20 may include a field effect transistor (FET), a bipolar junction transistor (BJT) or other devices having similar function. In FIGS. 9~10, an N-type metal-oxide-semiconductor (NMOS) transistor is used for illustration, but does not limit the scope of the present invention.

The current-detecting circuit 30 may include a resistor coupled between the second pin K and the third pin CS for providing a feedback voltage $V_{FB}$. The equivalent resistance $R_1 \sim R_{N+2}$ of the current-detecting circuit 30 for use in the current controllers $CC_1 \sim CC_{N+2}$ of the LED lighting devices 101~103 may have the same or different values. However, the configuration of the current-detecting circuit 30 does not limit the scope of the present invention.

In the embodiment depicted in FIG. 9, the current-detecting circuit 30 is configured to monitor the sum of the current flowing through the switch 20 and the luminescent device coupled between the first pin A and the third pin CS. If the sum of the current flowing through the switch 20 and the luminescent device is too large, the current controller CCA is configured to turn off the switch 20 or reduce the current flowing through the switch 20, thereby maintaining the overall current $I_{AK}$ at a constant value.

In the embodiment depicted in FIG. 10, the current-detecting circuit 30 is configured to monitor the current flowing through the luminescent device coupled between the first pin A and the third pin CS. If the current flowing through the luminescent device is too large, the current controller CCB is configured to turn on the switch 20 for shunting current, thereby maintaining the overall current $I_{AK}$ at a constant value.

The adjustable reference voltage generator 40 is configured to provide multiple reference voltages $V_{REF1} \sim V_{REF(N+2)}$ associated with the voltage $V_{AR1} \sim V_{AR(N+2)}$ and output one of the $V_{REF1} \sim V_{REF(N+2)}$ according the logic levels of two mode selection pins MS1 and MS2. For example, the adjustable reference voltage generator 40 provides the reference voltage $V_{REF1}$ to the comparator 50 in the current controller $CC_1$. Similarly, the reference voltages $V_{REF2} \sim V_{REF(N+2)}$ may be provided in the corresponding current controllers $CC_2 \sim CC_{(N+2)}$, respectively.

The comparator 50 is configured to operating the switch 20 according to the relationship between the feedback voltage $V_{FB}$ and the corresponding reference voltage so that the current flowing through each current controller does not exceed its current setting. For example, in the embodiment when N=3 and n=2, the maximum current setting $I_{MAX1}$ of the current controller $CC_1$ may be determined by the ($V_{REF1}/R_1$), the maximum current setting $I_{MAX2}$ of the current controller $CC_2$ may be determined by the ($V_{REF2}/R_2$), the maximum current setting $I_{MAX3}$ of the current controller $CC_3$ may be determined by the ($V_{REF3}/R_3$), the maximum current setting $I_{MAX4}$ of the current controller $CC_4$ may be determined by the ($V_{REF4}/R_4$), and the maximum current setting $I_{MAX5}$ of the current controller $CC_5$ may be determined by the ($V_{REF}/R_5$). By setting the logic levels of the mode selection pins MS1 and MS2 of each current controller, the current controllers $CC_1 \sim CC_5$ may provide different current settings, as depicted in FIGS. 4~8. The following table is the example of the current settings of the current controllers $CC_1 \sim CC_5$ according to the embodiments of FIGS. 1~3, but does not limit the scope of the present invention.

TABLE

| Current Controller | Mode Selection Pin | | Reference Voltage | Current Setting | |
|---|---|---|---|---|---|
| | MS2 | MS1 | | value | ratio |
| $CC_1$ | 0 | 1 | $V_{REF1}$ | $I_{MAX1}$ | 35% |
| $CC_2$ | 1 | 0 | $V_{REF2}$ | $I_{MAX2}$ | 55% |
| $CC_3$ | 1 | 1 | $V_{REF3}$ | $I_{MAX3}$ | 80% |
| $CC_4$ | 0 | 0 | $V_{REF4}$ | $I_{MAX4}$ | 100% |
| $CC_5$ | 0 | 1 | $V_{REF1}$ | $I_{MAX1}$ | 35% |

In the present invention, a corresponding pair of the current controller and the luminescent device may be fabricated as an integrated chip, such as an integrated chip $U_1$ containing the current controller $CC_1$ and the luminescent device $A_1$, an integrated chip $U_2$ containing the current controller $CC_2$ and the luminescent device $A_2$, . . . , and an integrated chip $U_{N+2}$ containing the current controller $CC_{N+2}$ and the luminescent device $A_{N+2}$. The integrated chips $U_1 \sim U_{N+2}$ as stand-alone devices may be fabricated in the same manufacturing process. According to different applications, various LED lighting devices may be fabricated using multiple integrated chips $U_1 \sim U_{N+2}$ with selected printed circuit board (PCB) layouts for setting the logic levels of the mode selection pins. Therefore, the present invention may provide LED lighting devices with various characteristics without complicating manufacturing process.

In the LED lighting device of the present invention, some of the luminescent devices may be conducted before the rectified AC voltage reaches the overall turn-on voltage of all luminescent devices for improving the power factor. The current controllers may provide flexible current settings so that the brightness of each luminescent device may be easily selected in order to achieve different degrees of color rendering. Therefore, the LED lighting device according to the present invention may improve the effective operational voltage range, the reliability and the color rendering index.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device, comprising:
   a first luminescent device driven by a rectified alternative-current (AC) voltage for providing light of a first color according to first current;
   a second luminescent device coupled in series to the first luminescent device and driven by the rectified AC voltage for providing light of the first color according to second current;
   a third luminescent device driven by the rectified AC voltage for providing light of a second color according to third current, wherein the second color is different from the first color;
   a first current controller configured to regulate the first current according to a first current setting, the first current controller comprising:
      a first pin coupled to a first end of the first luminescent device;
      a second pin; and
      a third pin coupled to a second end of the first luminescent device;
   a second current controller configured to regulate the second current according to a second current setting, the second current controller comprising:
      a first pin coupled to the second luminescent device;
      a second pin coupled to the rectified AC voltage; and
      a third pin; and
   a third current controller configured to regulate the third current according to a third current setting, the third current controller comprising:
      a first pin coupled to the third luminescent device; and
      a second pin.

2. The LED lighting device of claim 1, wherein:
   a first end of the third luminescent device is coupled to a first end of the second luminescent device;
   the first pin of the third current controller is coupled to a second end of the third luminescent device; and
   the second pin of the third current controller is coupled to a second end of the second luminescent device.

3. The LED lighting device of claim 1, wherein:
   the second luminescent device includes a plurality of LEDs;

the third current controller is coupled in series to the third luminescent device; and the third current controller and the third luminescent device are coupled in parallel to one LED or multiple adjacent LEDs among the plurality of LEDs in the second luminescent device.

4. The LED lighting device of claim 1, wherein:
a first end of the third luminescent device is coupled to the first end of the first luminescent device;
the first pin of the third current controller is coupled to a second end of the third luminescent device; and
the second pin of the third current controller is coupled to the second end of the first luminescent device.

5. The LED lighting device of claim 1, wherein:
the first luminescent device includes a plurality of LEDs;
the third current controller is coupled in series to the third luminescent device; and
the third current controller and the third luminescent device are coupled in parallel to one LED or multiple adjacent LEDs among the plurality of LEDs in the first luminescent device.

6. The LED lighting device of claim 1, wherein each current controller comprises:
a switch;
a current-detecting circuit configured to provide a feedback voltage associated with current flowing through the switch and the corresponding first, second or third luminescent device;
a reference voltage generator configured to provide a reference voltage; and
a comparator configured to operate the switch according to a relationship between the feedback voltage and the reference voltage outputted by the reference voltage generator.

7. The LED lighting device of claim 1, wherein:
the second luminescent device includes a plurality of LEDs;
the first pin of the third current controller is coupled to a first end of the third luminescent device;
a third pin of the third current controller is coupled to a second end of the third luminescent device; and
the first pin of the third current controller and the second pin of the third current controller are coupled between two LEDs among the plurality of LEDs in the second luminescent device.

8. The LED lighting device of claim 7, wherein the third current controller comprises:
a switch;
a current-detecting circuit configured to provide a feedback voltage associated with current flowing through the third luminescent device;
a reference voltage generator configured to provide a reference voltage; and
a comparator configured to operate the switch according to a relationship between the feedback voltage and the reference voltage outputted by the reference voltage generator.

9. The LED lighting device of claim 1, wherein the first current controller and the first luminescent device are fabricated as a first integrated chip, the second current controller and the second luminescent device are fabricated as a second integrated chip, and the third current controller and the third luminescent device are fabricated as a third integrated chip.

10. The LED lighting device of claim 1, wherein:
the first current controller further comprises a plurality of mode selection pins arranged to set the first current setting; and
the second current controller further comprises a plurality of mode selection pins arranged to set the second current setting; and
the third current controller further comprises a plurality of mode selection pins arranged to set the third current setting.

11. The LED lighting device of claim 10, wherein the first current controller is arranged in:
a first configuration in which a first mode selection pin of the first current controller is floating or is connected to the first pin of the first current controller and a second mode selection pin of the first current controller is connected to the second pin of the first current controller;
a second configuration in which the first mode selection pin of the first current controller is connected to the second pin of the first current controller and the second mode selection pin of the first current controller is floating or is connected to the first pin of the first current controller;
a third configuration in which the first mode selection pin and the second mode selection pin of the first current controller are floating or connected to the first pin of the first current controller; or
a fourth configuration in which the first mode selection pin and the second mode selection pin of the first current controller are connected to the second pin of the first current controller.

* * * * *